3,092,614
ETHYLENE POLYMERIZATION PROCESS
John F. Erdmann, Charleston, and Charles R. Welter, South Charleston, W. Va., assignors to Union Carbide Corporation, a corporation of New York
Filed Feb. 15, 1962, Ser. No. 176,845
6 Claims. (Cl. 260—94.9)

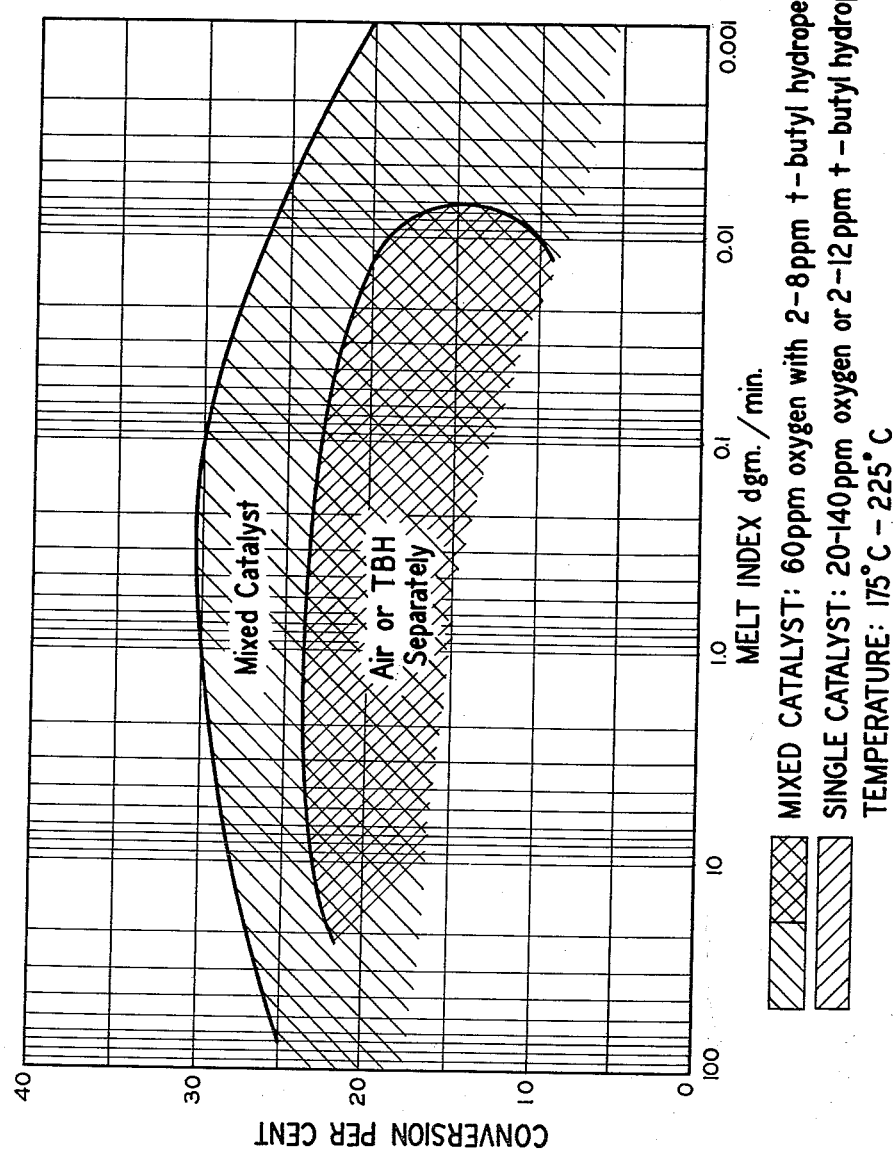

This invention relates to an improved process for polymerizing ethylene either alone or in admixture with one or more polymerizable compounds. This application is a continuation-in-part application of Serial No. 807,377 filed April 20, 1959 now abandoned.

It is known to polymerize ethylene using oxygen or air as a catalyst, as disclosed initially in United States Patent 2,153,553 and United States Patent 2,188,465 wherein normally solid polymers of ethylene are produced by subjecting ethylene to temperatures of from about 100° C. to about 400° C. at pressures above 500 atmospheres in the presence of oxygen. It is also known to polymerize ethylene in the presence of peroxidic catalysts at elevated temperatures and pressures, for example, as disclosed in United States Patent 2,409,996. In this latter patent ethylene is polymerized in a stirred autoclave at 100° C. to 275° C. at pressures of from about 400 to 1,000 atmospheres or above in the presence of alkyl hydroperoxide catalysts; the polymerization is preferably carried out using monomeric ethylene of high purity having an oxygen content of less than about 10 parts per million.

It has now been found that a mixture of oxygen and tertiary butyl hydroperoxide offers decided advantages over either oxygen alone or tertiary butyl hydroperoxide alone as a catalyst for the polymerization of ethylene. Furthermore, it has now been found that the characteristics of this system of mixed catalysts are decidedly different than expected from merely averaging the behavior of the individual catalysts; that a decidedly synergistic effect is observed, which results in unexpected and unforseen increases in conversion to polymer, greater ease in controlling the polymerization reaction, lower polymerization temperatures without decreasing the conversion, and improved quality of the polyethylene produced including production of higher molecular weight polymer than could be produced when using either catalyst alone, as evidenced by lower melt indices of the resins than can be obtained by the use of either catalyst by itself. The melt index, as is known, is a measure of the molecular weight of the polymer, and is inversely proportional to the molecular weight.

Molecular oxygen as a catalyst in ethylene polymerizations has certain inherent disadvantages, foremost among which is that it is relatively inactive at low temperatures. Thus it is difficult, if not impossible, to produce linear, high molecular weight polyethylene since at the elevated temperatures ordinarily required with oxygen as catalyst, chain branching and lower molecular weight resins are favored. In addition, the concentration of oxygen used as catalyst must be carefully controlled, since increasing the oxygen catalyst content may suddenly accelerate the reaction to such an extent that the heat of reaction is not dissipated fast enough, and the reaction temperature may even become sufficiently high so that the resin turns brown or decomposes to carbonaceous material; whereas, if the oxygen concentration is too low, the productivity drops with a resulting loss of profits due to low conversion.

Tertiary butyl hydroperoxide alone is an effective catalyst in producing high conversion of ethylene to polyethylene, but it initiates a polymerization reaction which is rapid and difficult to control. When this catalyst is used by itself, frequent decompositions occur, and polyethylene having low and widely varying molecular weights is often obtained. In addition, tertiary butyl hydroperoxide requires an even higher initiation temperature than oxygen thus making it even still more difficult to obtain high molecular weight polyethylene.

The process of this invention is preferably carried out in a continuously operated tubular reactor at temperatures of from about 160° C. to about 250° C., preferably from about 170° C. to about 200° C., and at pressures above about 15,000 p.s.i., preferably from about 25,000 p.s.i. to about 40,000 p.s.i., and may be as high as 100,000 p.s.i. or more. Use of the mixed oxygen tertiary butyl hydroperoxide catalysts of this invention under such narrow conditions results in increased conversions above the conversions obtained when using either catalyst alone. In addition, the molecular weights are increased as evidenced by the fact that the melt index of the polyethylene produced with the mixed catalysts can be as low as 0.001 decigram per minute even at 20 percent conversions, whereas when either catalyst is used alone, the melt index seldom, if ever, drops below 0.01 decigram per minute at conversion levels above about 17 percent.

The use of the mixed catalyst systems of this invention overcome, to a large extent, some of the difficulties encountered when oxygen or t-butyl hydroperoxide are used singly. Further, the mixed catalyst systems result in higher conversion to polymer having a specific melt index. This is clearly seen from the following table based on the drawing.

Table 1

| Melt Index of Polyethylene | Air or t-Butyl Hydroperoxide Alone | Mixed Catalyst |
|---|---|---|
| 0.006 | 15 | 25.5 |
| 0.01 | 19 | 26.5 |
| 0.05 | 22.5 | 29 |
| 0.1 | 23 | 30 |
| 0.5 | 23.5 | 30.5 |
| 1.0 | 23.5 | 30 |
| 5 | 23.5 | 28.5 |
| 10 | 23 | 28 |

The increased molecular weights and higher conversions achieved with our catalyst mixtures are plotted in the drawing. Examination of the results plotted in the drawing shows that the maximum conversion of ethylene to polymer using either oxygen or tertiary butyl hydroperoxide alone was about 23 percent and that the melt indices varied only from about 0.007 to about 30 decigrams per minute at these conversions. These results are encompassed within the area in which the lines slant from top left to bottom right. However, when the mixed catalyst compositions of this invention are used, the conversion to polymer can exceed 30 percent, and the melt indices at such conversions can vary from below 0.001 up to about 100 decigrams per minute, depending on the catalyst composition and concentration. The lines sloping from top right to bottom left encompass the scope obtainable with the catalyst mixtures of this invention. From the drawing it is clearly evident that oxygen or tertiary butyl hydroperoxide alone could not produce the high molecular weight, low melt index polymers obtainable by the catalyst mixtures of this invention when operated within the critical reaction conditions herein set forth. The fact that the catalyst mixtures of this invention do produce such low melt index resins at lower temperatures and at such good conversions was unexpected, and could not have been predicted or anticipated from the prior art, since generally a decrease in temperature causes a decrease in conversion. It is seen that the catalyst compositions of this invention extend the range of melt indices available and increase the conversions obtainable over those values which result when either catalyst is used alone; such results could not be foreseen or expected.

The total concentration of catalyst mixture used is dependent on the dimensions of the tubular reactor and will depend upon the ratio of the volume of the reactor to the cooling surface, since these factors will affect the feed rate. The total concentrations will also depend upon the temperature at which the polymerization is carried out, the rate of ethylene throughout (which can be varied from 500 to 4,000 pounds per hour per cubic foot or higher), and the heat transfer effected through the heavy reactor walls required for carrying out reactions at such elevated pressures. Thus the total catalyst concentration can be used to a large extent to control the reaction and prevent decomposition. This total catalyst concentration can be varied from about 51 to about 600 parts per million on a molar basis based on the ethylene charge, and is preferably from about 51 to about 150 parts per million. The catalyst concentration is defined in this application as the moles of catalyst, or individual component, per million moles of ethylene.

The concentration of the oxygen component present in the catalyst mixture can be varied from about 50 to about 500 parts per million based on the ethylene charged, and is preferably from about 50 to about 135 parts per million. The tertiary butyl hydroperoxide content can be varied from about 1 to about 100 parts per million, and is preferably from about 2 to about 15 parts per million. The ratio of oxygen to tertiary butyl hydroperoxide in the catalyst mixture is not critical, and can be varied over a wide range; ratios of from about 40:1 to about 2:1 have been found suitable, and should preferably be above about 7:1.

The tertiary butyl hydroperoxide is added to the polymerization reaction as a solution in an inert solvent such as benzene, toluene, iso-octane, and the like. The inert solvent can be present in the reactor to the extent of from about 0.1 to about 5 mole percent based on the ethylene being charged.

The purity of the ethylene is not critical and can vary from about 90 to 99.9 percent pure ethylene. Among the most common impurities found in commercially available ethylene are the low molecular weight hydrocarbons such as methane, ethane, propane, traces of propylene and traces of acetylene, with presence of the unsaturated hydrocarbons being less desirable than presence of the saturated hydrocarbons.

The mixed oxygen/tertiary butyl hydroperoxide catalyst compositions of this invention can also be used to polymerize ethylene mixtures containing chain transfer agents or other polymerizable olefinically unsaturated compounds; for example, ketones, alcohols, alkanes, cycloalkanes, arylalkanes, alkenes, vinyl esters, vinyl ethers, acrylic acid and its esters, et cetera.

The polymerization of ethylene by the process of this invention can be conveniently carried out in a continuously-operated tubular reactor about 50 to 150 feet long, or longer, having an inside diameter of from about 3/16 to 1/2 inch, or more. The ethylene was deoxygenated to less than 10 parts per million oxygen, and then filtered dry air was metered into the deoxygenated ethylene to provide the desired oxygen content. This ethylene feed, containing the oxygen catalyst, was compressed to 3,000 to 5,000 p.s.i. and cooled to liquefy. A solution of tertiary butyl hydroperoxide in an inert solvent was then metered into the liquid ethylene feed, which was further compressed by high pressure pumps to about 30,000 p.s.i. before entering the jacketed high pressure tubular reactor. The ethylene feed was passed through the reactor at a space velocity of from about 500 to 4,000 pounds per hour per cubic foot. The discharge mixture from the reactor was quenched in water, the unreacted ethylene was recovered for recycling, and the polymer produced was filtered from the aqueous slurry and dried.

In this specification the physical properties were determined according to the following procedures:

Melt Index _____ ASTM D-1238-52T.
Density _____ ASTM D-1505-57T.
Stiffness _____ ASTM D-638-56T.
Yield Point _____ ASTM D-638-56T.
Ultimate Tensile Strength _____ ASTM D-638-56T.
Elongation _____ ASTM D-638-56T.

The polyethylenes produced by the process of this invention are comparable in physical and chemical properties, such as stress crack resistance, brittleness, and infrared analysis for carbonyl and unsaturation, to the polyethylenes presently available on a commercial scale. The resins so produced find application in the same fields of commerce, for example, in moldings, extrusions, films, coatings, fibers, et cetera, but because of their improved properties they are more desirable.

The following examples further serve to illustrate this invention. In these examples the ethylene was deoxygenated to less than 10 parts per million oxygen, and then filtered air was metered into the desired oxygen concentration. After partial compression, as described above, a benzene solution of tertiary butyl hydroperoxide was metered in to provide the desired concentration of tertiary butyl hydroperoxide. The catalyst-containing ethylene feed was then reacted in a continuous tubular reactor about 60 feet long, having an inside diameter of about 3/16 inch.

Table II summarizes the reaction conditions, yields and the properties of the resins produced using a feed rate of from 2,000 to 3,000 pounds per hour per cubic foot, temperatures of from 170° C. to 225° C., reactor pressure of about 30,000 p.s.i., constant oxygen concentrations of about 60 parts per million and varying tertiary butyl hydroperoxide contents, as indicated. The improved effect of the mixed catalyst is strikingly brought out when the yields obtained with the mixed catalyst of this invention are compared with the yields obtained with oxygen alone at the same temperature, and with a control at 175° C. using 30 parts per million tertiary butyl hydroperoxide alone.

From Table II it can be seen that resins having the unexpected lower melt indices, or higher molecular weights, are consistently obtained at commercially practical conversions at polymerization temperatures of from about 170° C. to about 200° C. with the catalyst mixtures herein disclosed.

Further, it is seen that at 170° C. the use of 61 parts per million oxygen as the sole catalyst gives but 3.3 percent conversion to polymer; however, the addition of only 2 parts per million tertiary butyl hydroperoxide to 61 parts per million oxygen surprisingly and unexpectedly increases conversion to 17.8 percent, and even more surprisingly, the product produced has a higher molecular weight. This unexpected increase in conversion and in molecular weight is unobvious, and could not have been predicted as it was found that at 190° C. the use of 5.5 parts per million of tertiary butyl hydroperoxide gives but a 7.8 percent conversion to polymer.

The unexpected and unobvious results are apparent at the higher temperatures, preferably at temperatures up to about 200° C. Thus at 175° C. the use of 62 parts per million of oxygen alone as the catalyst results in a conversion of only 15.9 percent. If, instead of oxygen, one uses 30 parts per million tertiary butyl hydroperoxide alone, which is roughly equivalent to about 120 parts per million of oxygen, one gets a conversion of only 4 percent to resin having the same melt index as obtained at 175° C. with about 60 parts per million oxygen. However, if one adds only 2.2 parts per million of tertiary butyl hydroperoxide to the original 60 parts per million of oxygen, the conversion increases to 20.0 percent, and the melt index unexpectedly decreases to less than 0.001. The use of increased amounts of tertiary butyl hydroperoxide further increases the conversion without excessively increasing the melt index disproportionately when all the other variables are maintained constant. Such unexpected increases in conversion are unobvious when it is recalled that at temperatures below about 200° C. neither catalyst by itself will give a conversion much above about 15 percent.

The unobvious and unexpected improvements in conversion and melt index occur over the critical temperature range set forth in this specification. At 180° C. it is seen that conversion is doubled to 28.9 percent by the addition of only 8.2 parts per million tertiary butyl hydroperoxide to 62 parts per million of oxygen catalyst. Similar results are obtained at 185° C., 190° C. and 205° C., whereas at 225° C. the effect is not as pronounced.

lyst mixture comprising from about 50 to about 500 parts per million of oxygen and from about 1 to about 100 parts per million of tertiary butyl hydroperoxide, said catalyst concentration being on a molar basis based on the ethylene charged.

4. In a bulk tubular reactor process for polymerizing ethylene at a temperature between about 170° C. and 200° C. and a pressure above 15,000 p.s.i., the improvement which comprises conducting the polymerization in the presence of from about 51 to about 150 parts per million of a catalyst mixture comprising from about 50 to 135 parts per million of oxygen and from about 2 to about 15 parts per million of tertiary butyl hydroperoxide, said catalyst concentration being on a molar basis based on the ethylene charged.

*Table II*

| Example | 1 | 2 | 3 | 4 | 5 | 6 | 7 | 8 | 9 | 10 |
|---|---|---|---|---|---|---|---|---|---|---|
| Catalyst, ppm.: | | | | | | | | | | |
| Oxygen | 61 | 63 | 66 | 62 | 63 | 64 | 61 | 62 | 62 | 61 |
| t-Butyl hydroperoxide | 0 | 2.1 | 8.7 | 0 | 2.1 | 8.7 | 0 | 2.0 | 8.2 | 0 |
| Reactor temperature, °C. | 225 | 225 | 225 | 205 | 205 | 205 | 190 | 190 | 190 | 185 |
| Conversion, percent | 20.2 | 22.0 | 25.5 | 15.5 | 24.0 | 24.3 | 14.5 | 15.8 | 26.5 | 14.5 |
| Increase in conversion, percent: | | | | | | | | | | |
| Over oxygen alone | | 9 | 26 | | 55 | 57 | | 9 | 83 | |
| Melt index, dgm./min | 0.74 | 9.3 | 74 | 0.07 | 3.3 | 28 | 0.38 | 0.04 | 6.8 | 0.12 |
| Density, g./cc | .9204 | .9159 | .9185 | .9221 | .9180 | H.9138 | .9263 | .9228 | .9336 | .9260 |
| Tensile properties: | | | | | | | | | | |
| Stiffness, p.s.i. × 10⁻³ | 21 | 15 | | 22 | 18 | 11 | 33 | 22 | 12 | 31 |
| Yield point, p.s.i. | 1,510 | 1,280 | | 1,560 | 1,400 | 1,160 | 2,210 | 1,680 | 1,110 | 1,840 |
| Ultimate tensile, p.s.i. | 2,045 | 1,150 | | 2,590 | 1,720 | 980 | 2,390 | 1,335 | 1,110 | 2,460 |
| Elongation, percent | 460 | 285 | | 865 | 680 | 157 | 775 | 155 | 113 | 885 |

| Example | 11 | 12 | 13 | 14 | 15 | 16 | 17 | 18 | 19 | 20 |
|---|---|---|---|---|---|---|---|---|---|---|
| Catalyst, p.p.m.: | | | | | | | | | | |
| Oxygen | 60 | 61 | 62 | 62 | 62 | 62 | 61 | 0 | 61 | 61 |
| t-Butyl hydroperoxide | 2.1 | 8.2 | 0 | 8.2 | 0 | 2.2 | 8.2 | 30 | 0 | 2.0 |
| Reactor temperature, °C. | 185 | 185 | 180 | 180 | 175 | 175 | 175 | 175 | 170 | 170 |
| Conversion, percent | 16.4 | 28.5 | 14.3 | 28.9 | 15.9 | 20.0 | 28.8 | 4 | 3.3 | 17.8 |
| Increase in conversion, percent: | | | | | | | | | | |
| Over oxygen alone | 13 | 97 | | 102 | | 26 | 87 | | | 440 |
| Melt index, dgm./min | <.001 | 3.0 | 0.06 | 0.73 | 0.02 | <.001 | 0.12 | 0.02 | 0.05 | <.001 |
| Density, g./cc | .9221 | .9260 | .9250 | .9178 | .9258 | .9242 | .9194 | | .9270 | .9246 |
| Tensile properties: | | | | | | | | | | |
| Stiffness, p.s.i. × 10⁻³ | 12 | 15 | 16 | 16 | 35 | 23 | 20 | | 38 | 27 |
| Yield point, p.s.i. | 1,590 | 1,210 | 1,950 | 1,400 | 1,990 | 1,850 | 1,530 | | 1,470 | 1,910 |
| Ultimate tensile, p.s.i. | 1,070 | 1,035 | 2,400 | 1,730 | 2,900 | 2,550 | 20010 | | 2,130 | 3,425 |
| Elongation, percent | 425 | 170 | 640 | 740 | 785 | 480 | 550 | | 580 | 585 |

What is claimed is:

1. In a bulk tubular reactor continuous process for polymerizing ethylene at a temperature between about 160° C. and 250° C. and a pressure above 15,000 p.s.i., the improvement which comprises conducting the polymerization reaction in the presence of a catalyst mixture comprising from about 50 to about 500 parts per million of oxygen and from about 1 to about 100 parts per million of tertiary butyl hydroperoxide, said catalyst concentration being on a molar basis based on the ethylene charged.

2. In a bulk tubular reactor process for polymerizing ethylene at a temperature between about 160° C. and 250° C. and a pressure above 15,000 p.s.i., the improvement which comprises conducting the polymerization reaction in the presence of from about 51 to about 600 parts per million of a catalyst mixture comprising from about 50 to 500 parts per million of oxygen and from about 1 to about 100 parts per million of tertiary butyl hydroperoxide, said catalyst concentration being on a molar basis based on the ethylene charged.

3. In a bulk tubular reactor process for polymerizing ethylene at a temperature between about 170° C. and 200° C. and a pressure between about 25,000 p.s.i. and 40,000 p.s.i., the improvement which comprises conducting the polymerization reaction in the presence of a cata- 5. In a bulk tubular reactor process for polymerizing ethylene at a temperature between about 170° C. and 200° C. and a pressure between about 25,000 p.s.i. and 40,000 p.s.i., the improvement which comprises conducting the polymerization in the presence of from about 51 to about 150 parts per million of a catalyst mixture comprising from about 50 to about 135 parts per million of oxygen and from about 2 to about 15 parts per million of tertiary butyl hydroperoxide, said catalyst concentration being on a molar basis based on the ethylene charged.

6. In a bulk tubular reactor process for polymerizing ethylene at a temperature between about 170° C. and 200° C. and a pressure between about 25,000 p.s.i. and 40,000 p.s.i., the improvement which comprises conducting the polymerization in the presence of a catalyst mixture comprising from about 50 to about 135 parts per million of oxygen and from about 2 to about 15 parts per million of tertiary butyl hydroperoxide, said catalyst concentration being on a molar basis based on the ethylene charged.

References Cited in the file of this patent

FOREIGN PATENTS 591,335     Great Britain _____ Aug. 14, 1947